WILLIAM H. JOYCE, JR.,
INVENTOR

Jan. 16, 1945. W. H. JOYCE, JR 2,367,218
TRACK-WAY WORK STATION RACK COMBINATION
Original Filed May 24, 1941   2 Sheets-Sheet 2
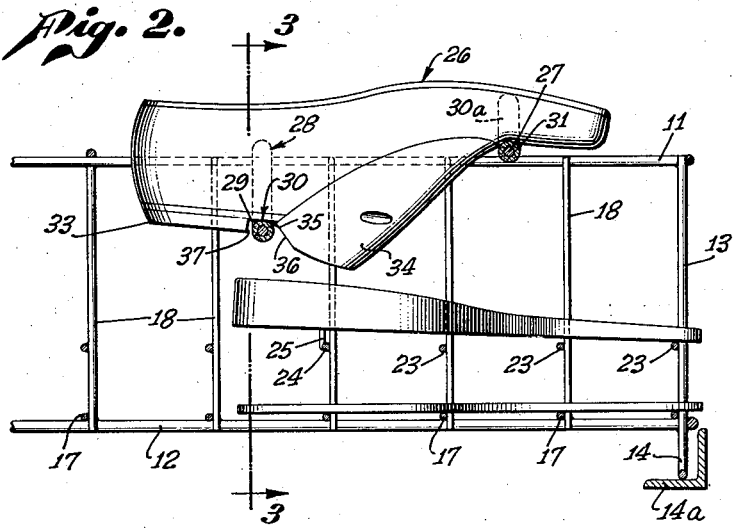
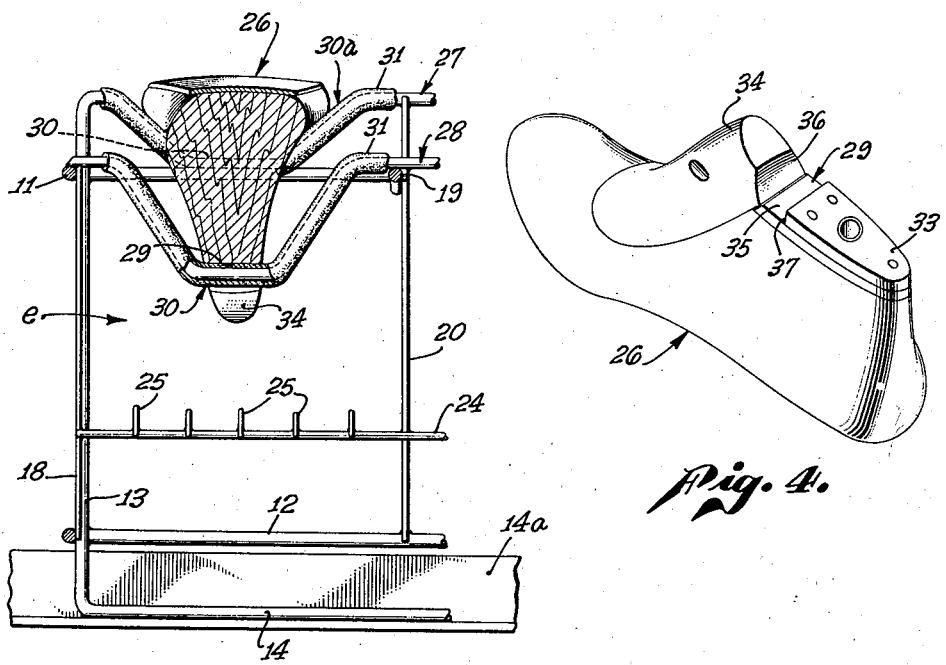
WILLIAM H. JOYCE, JR.,
INVENTOR
BY
ATTORNEY Patented Jan. 16, 1945

2,367,218

UNITED STATES PATENT OFFICE 2,367,218

TRACKWAY WORK STATION RACK COMBINATION

William H. Joyce, Jr., Pasadena, Calif., assignor to Joyce, Inc., Pasadena, Calif., a corporation of California Original application May 24, 1941, Serial No. 395,050. Divided and this application June 5, 1942, Serial No. 445,902

7 Claims. (Cl. 211—34)

My invention relates generally to the manufacturing of articles from preformed parts, and more particularly to a track-way work station rack combination and work carrying basket and is a division of my copending application Serial No. 395,050 filed May 24, 1941, for Method and apparatus for manufacturing articles from preformed parts.

Regarding, for purposes of distinction, some prior conventional manufacturing methods and apparatus: In assembling automobiles, for example, it is common to employ an assembly line where parts are delivered separately to work stations, and these parts are added to each automobile structure as it is moved along by power. This system has utility where the parts and the finished article are so standardized as to be interchangeable, requiring no discretionary selection, fitting, or extra attention. Such a method allows for no variables in design, pattern, materials or labor. Moreover, it can be used to best advantage only on relatively large articles where sufficient room is naturally necessitated and provided for a sufficient number of workmen at any given point to collectively perform difficult operations equal in time consumption to that required at other stations for fewer workmen to perform simple operations. Such provision is a corollary to the automatic movement of the articles along the assembly line. When such a system is used for assembling smaller articles, assuming they are absolutely standardized, it is ordinarily necessary for grouped workmen performing any given time consuming operation to work on alternate or selected articles at any one station, to compensate in consumed time for more simple and rapidly performed operations.

From another viewpoint, there is a problem in efficiently dealing in fractions of people. There are numerous steps in some manufacturing systems which alone are not enough to keep one man busy, assuming a flow of work synchronized with the slowest operation along the line. That means that, with a fixed time interval for the work to travel a certain distance, some workmen are employed below their capacity.

Another method, found widely used for example in the shoe industry, is to assemble relatively large quantities of parts in portable carriers, or racks, and roll them over the floor from one location to another, allowing the racks to stand with the parts of substantial quantities of shoes therein while work is performed.

Thus, it has been conventional practice to manufacture shoes in thirty six pair lots, involving large accumulations of partly finished shoes standing in racks while an operator finished an operation on the thirty six pairs before passing the rack on to the next operator. Unless all thirty six pairs are of the same pattern, material, color, and size, the operator has to sort over and select the matching parts, and even when he does not have to do that the process is wasteful. Under that process, it is necessary to let the shoes "cure" for two or three days before pulling the lasts. Such a system requires an excessive quantity of lasts and inventory of shoes in process, inconvenient and costly time delay, and large floor space for storage in transit. Moreover, the long exposure often results in the shoes becoming soiled.

It is an object of my invention to provide a method and apparatus for manufacturing articles from preformed parts in multiples of small lots, moving the parts and partly finished articles along a fixed path from one operator or group of operators to the next in rapid, efficient succession amounting in net result to a continuous process.

A further object is to provide an apparatus suitable for performing a method of manufacturing articles from preformed parts comprising the steps of assembling the preformed parts for an article in a carrier unit adapted to hold the parts for a relatively small number of articles, performing successive assembly operations with and on said parts, manually moving each container along a fixed path as each work operation on the parts therein contained is completed, and thus gradually unloading the container of parts as said work progresses, so that when the work is completed the assembled articles originating from parts in the container may be removed, and the empty container be returned to the point of assembly.

This apparatus will vary according to the nature of the articles to be manufactured, but the minimum essential elements are: (1) a track, preferably all on one level, along which are arranged work stations and machines needed for the successive operations; and (2) individual containers designed to slide along the track and constructed to hold the primary parts for a relatively small number of articles, preferably in separate compartments.

Another object of my invention is to provide a track-way work station rack combination which includes a track for an assembly line, and a work basket or container adapted to be advanced along the track, and which is adapted to contain in convenient arrangement and accessibility the several parts of a relatively small number of complete articles, such for example as shoes, whereby operators at work stations along the line may perform assembly and finishing operations upon all of the units in the basket while the basket dwells at the operator's station, and which apparatus permits successive work operations on the same units at successive work stations, until the several parts originally contained in the basket at the beginning of the assembly line have been united into the number of finished units represented by the said parts.

Another object of my invention is to provide a suitable container for carrying preformed parts of an article of manufacture, which is relatively light and at the same time of relatively rigid construction, in which all of the preformed parts are readily accessible to the workmen, and which may be manually advanced from one work station to the next.

A further and more particular object of my invention is to provide in a track-way work station rack combination a rack or container or basket especially suitable for containing in separate compartments the parts for a relatively small number of pairs of shoes, the parts for any given pattern and size having been selected and placed in the basket at the start of its travel along the track, whereby operators at successive work stations may take the necessary parts of each shoe from the basket, perform their designated work thereon, replace the partly finished shoe in the basket, and when the work on all of the shoes in the basket has been performed at the station, the basket may be manually advanced, or advanced under the control of the operator, toward the next work station in line.

A still further object is to provide a basket of the character described which supports the parts in full view of the operator, and in a regular position in a designated compartment, whereby each operator can pick up the parts necessary to his operation without having to search for the same, or select them from a common supply. This is especially important in the manufacture of shoes where patterns and sizes vary, for it eliminates the necessity for the operators sorting out corresponding parts to match the pattern and style.

Further objects and advantages of my invention will readily be seen from the detailed description thereof.

In the drawings:

Figure 2 is a partial section on a plane indicated by line 2—2 in Figure 1.

Figure 3 is a partial section indicated by line 3—3 in Figure 2.

Figure 4 is a perspective view of the last used in connection with the work carrying basket.

Figure 1:
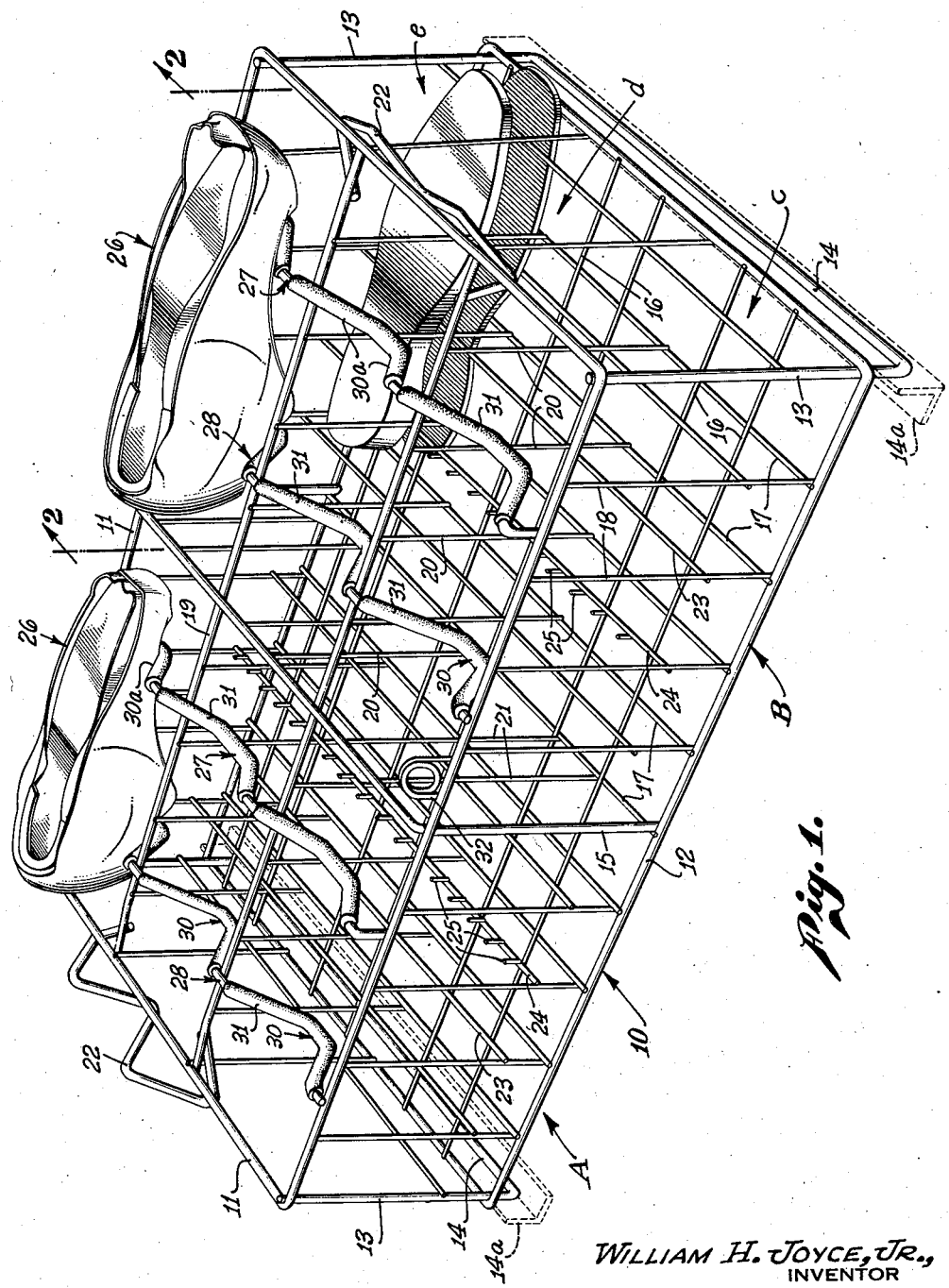
Figure 1 is a perspective view of my work carrying basket mounted on a section of track.

The work carrying basket illustrated in Figure 1 comprises a frame 10 which includes an upper rectangular heavy wire member 11 and a corresponding lower rectangular heavy wire member 12. The frame is supported by vertical end members 13. The wires throughout the basket may be welded or joined by any desired means. The end members are preferably U shaped, each having a horizontal portion 14 which extends below and parallel to the end of the lower rectangular member 12. The extensions 14 are adapted to rest in and slide along the track 14a shown in Figure 1 in dotted lines.

The form of the track 14a may vary, it being sufficient if comprising oppositely disposed angle irons mounted on any suitable table-high supports (not illustrated) so that the baskets may be slid along by operators as their respective work is performed. By the phrase "table-high" I mean at such height from the floor as to correspond to the approximate level of ordinary work table and benches, so that the baskets are within easy and convenient reach of the operators. Such height is not absolutely necessary, as the parts are removed from the baskets for work, but the more conveniently located the baskets are, the more efficient is the labor.

An inverted U shaped intermediate bracing member 15 increases the rigidity of the basket and divides the basket into two sections A and B. The floor of the basket is made up of longitudinal wires 16 and lateral wires 17 joined to the lower rectangular member 12. Vertical intermediate wires 18 are joined to the upper and lower rectangular members 11 and 12 at both sides of the basket. Each half of the basket is divided into three major compartments by upper longitudinal frame members 19 and vertical members 20 corresponding to the vertical members 18, members 20 being secured at the lower end to the wires 17. Additional members 21 extend between the horizontal part of the member 15 and the corresponding cross wire 17.

At each end of the basket is secured an attaching member 22 in the form of wire loops which extend obliquely upward from the ends of the basket to be caught by swiveled hooks in a dryer (not shown here).

A middle shelf in the basket is made up of cross wires 23 and 24. The wires 24 are provided with short upstanding pins 25.

The upper tray or cradle of the basket is intended to contain the last and uppers of the shoe 26 and comprises cross wires 27 and 28 bent so that when an inverted last is seated therein the rear portion of the last provided with a notch 29 rests on a relatively narrow flat section 30 of the wires 28, and the sides of the last and the shoe upper nestle snugly in the tapered extension 30a of the wire 27. The wire 27 provides a more shallow depression which the toe portion of the inverted last fits.

The wires 27 and 28 are preferably covered at least in part with a white rubber tubing 31 or other clean cushioning elements to avoid the possibility of wires abraiding or discoloring the shoes.

As seen from this description, the basket is divided into two sections A and B, and each section is divided into three major compartments c, d and e. Parts for each pair of shoes are to be contained in the corresponding compartments of the opposite sections A and B. It is intended that the upper and last be seated in the upper tray or cradle, the midsole or pad being disposed on the middle shelf and the outsole resting upon the floor of the basket.

The purpose of the pins 25 is to frictionally engage the midsole or pad to prevent it from sliding out, and also to reduce the area of contact between the midsole or pad and its supporting element in the basket if the midsole has been cemented on both sides as a step before the shoe parts have been finally assembled.

A spring clip 32 is provided to carry work tickets or the like. If counters are used for the shoes, they may be hung on any one of the upper horizontal frame wires.

While I have shown a basket adapted to contain three pairs of shoes it is obvious that the basket's construction may be suitably altered for carrying more or less than three pairs. Metallic, wood or plastic strips or framework may be substituted for the wire. The important thing is to provide lightness and rigidity. Some advantage is realized also by large apertures so that the parts may be seen and a full circulation of air around the parts be maintained.

The last illustrated is characterized by the provision of the notch 29 (see Figure 4) formed by cutting out part of the block 33 and the top 34. This notch has a flat surface 35 adapted to rest on the flat section 30 of the upper wire tray or cradle in the basket, and the inclined end 36 of the block and the vertical edge 37 of the top are adapted to engage the wire to prevent the last from shifting forward or backward.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures.

In general, what I conceive to be my invention is a track-way work station rack combination, and a unit carrier for work of the general character described comprising a light weight manually portable container having openings for access to and inspection of parts contained therein and for the free circulation of air therethrough; and in the form illustrated including separate compartments, each adapted to receive and retain the uppers and sole members of one shoe only and each compartment provided with separate shelves to respectively receive the outsole, the pad, and upper on a last.

Having described my invention, what I claim as new and desire to secure by Letters Patent is:

1. A unit carrier for work of the character described comprising: a light weight manually portable container having open sides, ends, top and bottom for the inspection of articles contained in the carrier and for circulation of air therethrough, and including separate compartments each adapted to contain the upper and sole members for one shoe only, each of said compartments including a shelf for a pad formed with short upstanding pins to support and retain the pad.

2. A unit carrier for work of the character described comprising: a light weight manually portable container having open sides, ends, top and bottom for the inspection of articles contained in the container and for circulation of air therethrough, and including separate compartments each adapted to contain the upper and sole members for one shoe only, each of said compartments including a tray for an upper on a last comprising a relatively deep supporting member to nest the rear part of an inverted last and upper, and a relatively shallow supporting member to nest the forepart of the last and upper.

3. A unit carrier for work of the character described comprising: a light weight manually portable container having open sides, ends, top and bottom for the inspection of articles contained in the container and for circulation of air therethrough, and including separate compartments each adapted to contain the upper and sole members for one shoe only, each of said compartments including a floor for an outsole, a shelf for a pad, and a tray for an upper on a last, and carrying loops extending outwardly from both ends of the container adapted to be engaged by hooks for transporting the container through a mechanically operated dryer.

4. A unit carrier for work of the character described comprising: a light weight manually portable container having open sides, ends, top and bottom for the inspection of articles contained in the container and for circulation of air therethrough, and including separate compartments each adapted to contain the upper and sole members for one shoe only, each of said compartments including a floor for an outsole, a shelf for a pad formed with short upstanding pins to support and retain the pad, a tray for an upper on a last comprising a relatively deep supporting member with slanting sides to nest the rear part of an inverted last and upper, and a relatively shallow supporting member with slanting sides to nest the forepart of the last and upper, and carrying loops extending outwardly from both ends of the basket adapted to be engaged by hooks for transporting the basket through a mechanically operated dryer.

5. A unit carrier for work of the character described comprising: a manually portable basket having a plurality of compartments on a common level, each of said compartments having a plurality of superimposed shelves, each shelf being adapted to contain a part to be assembled into a shoe the parts for which are in one compartment, and said shelves being individually accessible for removing and replacing parts, the upper shelf being in the form of a cradle comprising a plurality of depressed supports of different depths adapted to receive the heel and toe portions of an inverted last.

6. A unit carrier for work of the character described comprising: a manually portable basket having a plurality of compartments on a common level, each of said compartments having a plurality of superimposed shelves, each shelf being adapted to contain a part to be assembled into a shoe the parts for which are in one compartment, and said shelves being individually accessible for removing and replacing parts, the upper shelf being in the form of a cradle comprising a plurality of depressed supports of different depths adapted to receive the heel and toe portions of an inverted last, and the other shelves comprising substantially flat trays open at the end.

7. A unit carrier for work of the character described comprising: a manually portable basket having a plurality of compartments on a common level, each of said compartments having a plurality of superimposed shelves, each shelf being adapted to contain a part to be assembled into a shoe the parts for which are in one compartment, and said shelves being individually accessible for removing and replacing parts, the upper shelf being in the form of a cradle comprising a plurality of depressed supports of different depths adapted to receive the heel and toe portions of an inverted last and one of said other shelves being provided with upstanding pins to elevate and support a shoe part.

WILLIAM H. JOYCE, Jr.